July 16, 1935.  C. S. HAZARD  2,008,500
FLUID METER
Filed Sept. 22, 1933
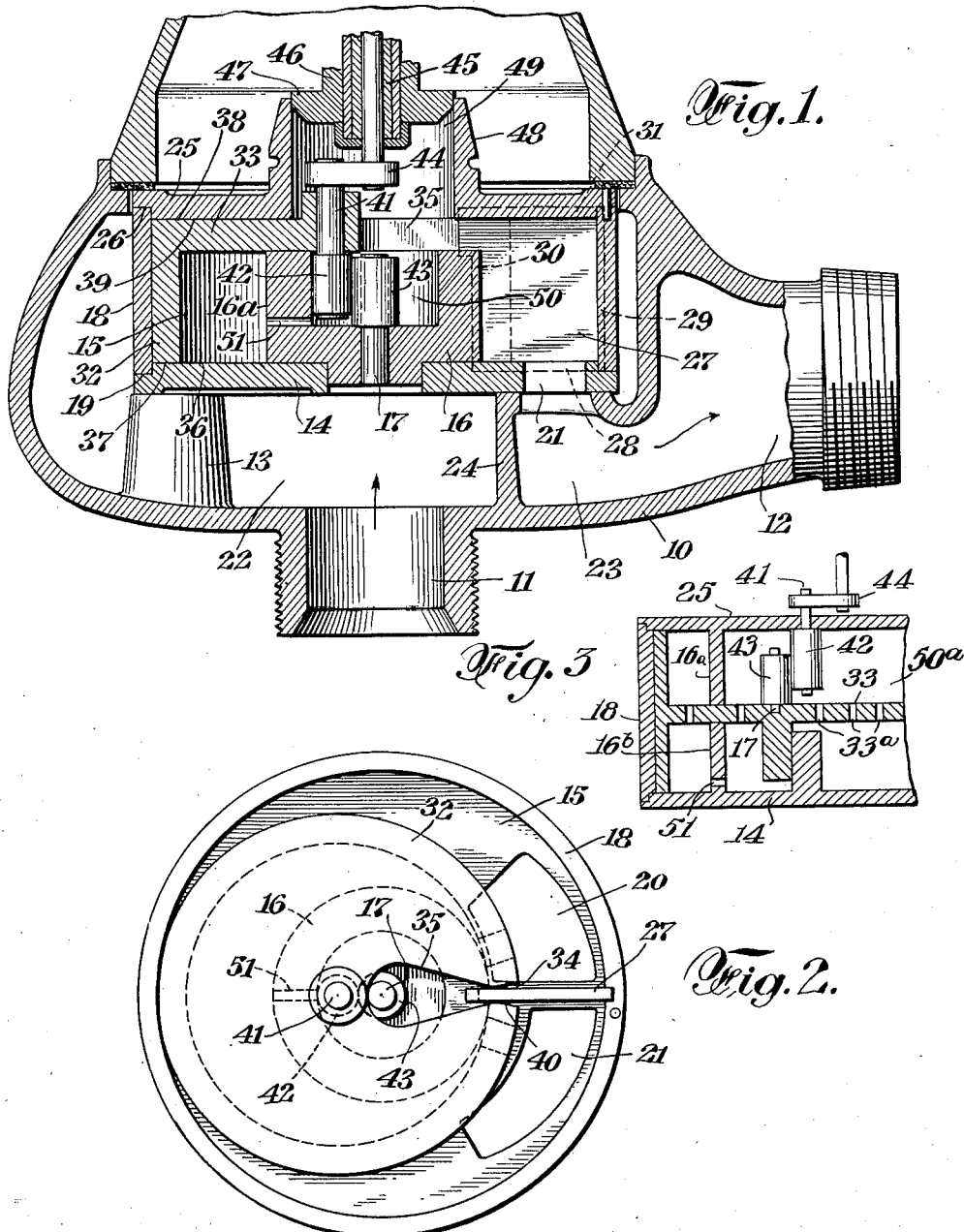
INVENTOR
Charles S. Hazard
BY
ATTORNEYS Patented July 16, 1935

2,008,500

UNITED STATES PATENT OFFICE 2,008,500

FLUID METER

Charles S. Hazard, Flushing, N. Y., assignor to Neptune Meter Company, a corporation of New Jersey Application September 22, 1933, Serial No. 690,516

1 Claim. (Cl. 73—37)

This invention relates to an improvement in fluid meters of the oscillating piston type in which the continuous flow of a fluid through the meter causes a piston of the ring type to oscillate in an annular chamber about a constantly changing fulcrum while the center of the piston is constrained to revolve through a circular orbit concentric with the walls of the chamber.

Meters of this type operate upon the displacement principle, the piston serving in conjunction with a radial partition member extending across and interrupting the continuity of the annular chamber, to divide the annular chamber into receiving and discharging spaces and operating to fill and empty the chamber at each complete oscillation. The volume of fluid passed by the mechanism for each complete oscillation of the piston is registered by a registering mechanism through suitable actuating means which is operated by the movement of the piston. As generally constructed the connections with the register actuating means are made by forming the piston with a web portion extending across the chamber and carrying a centrally disposed pin or stud adapted to engage with a centrally disposed pin or stud fixed to one of the end walls of the chamber. The annular chamber within which the piston oscillates is defined on its inner side by a circular wall, or center ring, concentric with respect to the outer wall of the chamber, and enclosing the space within which the pin or stud carried by the web of the piston moves about the fixed stud. The web portion may extend across the space enclosed by the piston intermediately of the top and bottom of the piston in which case two center rings engaging the web are provided. Alternatively, the web may extend across one end of the piston. In this case it will bear against one of the end walls of the chamber on the one side and against the center ring on the other to form a fluid seal fit.

In order to permit the piston to move in the desired oscillating path, the side wall of the piston is slotted so that it may be fitted over the radial partition member against which it bears in the course of its oscillating movement. Likewise the web or head portion must be slotted radially and cut away sufficiently to permit of the necessary pivoting movements of the piston with respect to the partition member. Because of this it results that fluid entering the chamber is permitted access to the space within the center ring during approximately one-half a period of oscillation of the piston. In meters of this type as heretofore constructed leakage from the center ring space has been prevented by closing the space, as by extending the head members across this space or by using a cup shaped center ring, or center cup, closed at one end.

Since a fluid entering the center cup has no chance to escape except by the way it enters, it follows that the movements into and from this space are limited and do not affect the measuring functions of the meter. However, when measuring fluids, and particularly liquids such as gasoline and other petroleum products, it frequently happens that the fluid will carry small amounts of some heavier more or less immiscible fluid or other extraneous substance. For example, in metering gasoline it frequently happens that a small amount of water will be present in the gasoline. If this is the case water introduced with the gasoline into the center ring space will tend to settle out and accumulate. If this water should freeze it would stop the meter due to the fact that the cooperating studs that control the movements of the piston and enable operation of registering mechanism are disposed within the interior space of the center ring and hence immersed in water that accumulates therein. Similarly, when meters are taken out of service, it is desirable that they be completely drained of liquid. When petroleum products remain in the chamber, they may form a gum or deposit in the chamber and prevent further operation of the meter until it is taken apart and cleaned.

The present invention has for an object to prevent the accumulation of water or other substances in the center ring space, and to insure that the meter will automatically drain itself completely when it is taken out of service or the supply of fluid to it is discontinued.

Other advantages and objects of the invention will appear as the description proceeds.

In the drawing:

Fig. 1 is a vertical section through the assembled meter, with the measuring chamber and the oscillating piston likewise shown in section;

Fig. 2 is a plan view of the measuring chamber and the oscillating piston with the top head member removed; and Fig. 3 is a fragmentary vertical sectional view of another type of meter, embodying the invention, in which the web portion of the piston is located intermediate the top and bottom thereof.

Referring to the drawing, 10 is a meter housing provided with an inlet 11 and an outlet 12. A platform 13 is formed within the housing to support the bottom head member 14 of the measuring chamber 15. Centrally disposed with respect to the head member 14 is a center cup 16 having a pin 17 mounted therein. A cylindrical wall 18 is fitted in a peripheral groove 19 in the bottom head member 14. The member 14 is provided with openings 20 and 21 respectively communicating with the inlet and outlet spaces 22 and 23 of the housing. These spaces are separated and defined by the walls of the measuring chamber 15 and the partition 24. The chamber 15 is closed at the top by a head member 25 provided with a peripheral groove 26 similar to groove 19 and adapted to engage the uper edge of the wall 18. A partition plate 27 extends across the annular space between the center cup 16 and the cylindrical wall 18 and closely fits in grooves 28, 29, 30 and 31 respectively provided in the bottom head member 14, the inner side of the wall 18, the outer side of the cylindrical wall 16a of the center cup 16, and the bottom of the top head member 25. A ring piston 32 having a transversely extending web or head portion 33 fits within the annular space between the center cup and the outer cylindrical wall of the measuring chamber 15. The piston is slotted as at 34, the slot being continued and enlarged in the web portion, as at 35, to permit the desired angular movements of the piston in the course of its oscillations with respect to the partition plate 27. The inner side of the bottom head 14 is provided with a bearing face portion 36 adapted to engage a bearing face 37 on the lower edge of the piston 32. Similarly, the inner side of the top head member 25 is provided with a bearing face portion 38 adapted to engage a bearing face 39 on the upper side of the web portion 33. The slot 34 in the piston 32 is preferably formed with outwardly tapering sides 40 constituting bearing surfaces adapted to bear against the partition plate 27 and to co-operate with the other bearing surfaces above mentioned in dividing the measuring chamber into two compartments, which in the operation of the meter constantly vary in dimension and constitute alternately a receiving compartment and a discharging compartment depending upon which is in communication with the inlet opening 20. A pin 41 is secured in the web portion 33 of the piston and axially thereof, and is provided with an enlarged lower end portion 42 adapted to engage a loose collar 43 carried by the stud 17. At its upper end the pin 41 engages a power takeoff mechanism 44 mounted in a bushing 45 carried by a flanged tubular member 46, the lower flanged end of which is received in an upwardly extending flange 48 formed on the top head member 25. The flanged member 46 serves to close the opening formed by the flange 48 and prevents fluid entering the space within the flange 48 and above the web 33 from escaping from the meter except through the outlet 12.

With the inlet and outlet openings arranged as shown in the drawing, the center of the piston 32 moves, under the impulse of the fluid entering at 20, in a counter-clockwise direction about the pin 17. During the earlier part of the half of the oscillation cycle in which the center of the piston 32 is being moved from a position directly in line with but between the pin 17 and the partition plate 27 to the position shown in Fig. 2, the gasoline, or other fluid being measured, is free to pass from the inlet opening 20 through the opening 35 in the web 33 into the space 50 within the center cup 16 and also into the space 49 above the web 33. During a part of the second half of the oscillation cycle the opening 35 establishes communication between the outlet opening 21 and the spaces 49 and 50. The space 49 being higher, liquid contained therein will drain freely through the outlet opening 21. On the other hand, the liquid contained in the space 50 will remain there unless other means is provided for draining this space. For this purpose I provide a drain opening 51 in the side wall 16a of the center cup 16. In order that the drain opening will not affect the registration of the meter it is necessary that it be located so that it drains to the inlet side of the measuring chamber 15 when the center cup 16 is in communication with the inlet opening 20 and vice versa, that it drains to the outlet side of the measuring chamber when the center cup is in communication with the outlet opening 21. This is accomplished by locating the drain opening 51 diametrically opposite the partition plate 27. Any substantial change in the location of the drain opening 51 relative to the partition plate will produce a leak by permitting liquid to by-pass the measuring chamber at some or all points in the oscillation of the piston. With the arrangement shown, the accumulation of water or other relatively heavy substances in the space 50 is prevented. At the same time, the space 50 automatically drains itself when the meter is taken out of service or when the supply of fluid is cut off. It will be understood that this latter feature is of value not only in metering petroleum products or other liquids which may contain water, but also when metering water and similar liquids. By providing the automatic drain it becomes unnecessary to remove the meter when the service is cut off as is now the case in situations where the possibility of freezing temperatures must be considered.

In Figure 3, there is shown a portion of a meter in which, as previously mentioned, the web portion 33 of the piston extends across the space enclosed by the piston 32 intermediately of the top and bottom of the piston. Ordinarily web 33 is provided with perforations 33a to equalize the pressure on both sides of the piston. In this case two center rings 16a and 16b are provided extending respectively from the top head 25 and the bottom head 14 of the chamber and closely engaging the web on each side to form a fluid seal fit. The parts 17, 43, 42, 41 for actuating the registering mechanism are located in the upper central chamber 50a defined at top and bottom by the top head 25 and web 33 and the drain opening 51 is located in the wall 16b opposite the usual partition plate.

While the invention has been described with particular reference to the accompanying drawing, it will be understood that various modifications in the details of the construction may be made without departing from the scope of the invention which is not to be deemed as limited otherwise than as indicated in the appended claim.

While the invention has been described with particular reference to the accompanying drawing, it will be understood that various modifications in the details of the construction may be made without departing from the scope of the invention which is not to be deemed as limited otherwise than as indicated in the appended claim.

I claim:

In a fluid meter, a cylindrical chamber, a center ring member concentrically mounted within and spaced from the annular wall of said chamber, and defining an annular fluid measuring chamber between itself and said annular wall, said measuring chamber having inlet and outlet openings for the fluid to be measured, a partition member extending across and interrupting the continuity of said measuring chamber, said member being disposed adjacent to and intermediate the fluid inlet and outlet openings of said chamber, an oscillating piston fitting in said measuring chamber and slotted radially to straddle said partition, means carried by said piston and engaging with means disposed within said center ring member for constraining the movement of said piston so that the center thereof is caused to revolve through a circular orbit concentric with the annular wall of said cylindrical chamber, and a fluid connection establishing communication between the interior of said center ring adjacent the bottom thereof and said measuring chamber, said connection being so disposed with respect to the inlet and outlet openings of said measuring chamber as to prevent any of the liquid introduced through said inlet opening from by-passing said measuring chamber.

CHARLES S. HAZARD.